3,488,205
METHOD OF REPAIRING METAL SURFACES
John William Baker, Uxbridge, Middlesex, England, assignor to Eutectic Welding Alloys Co., Ltd., North Feltham, Middlesex, England, a corporation of England
No Drawing. Filed June 13, 1966, Ser. No. 556,888
Int. Cl. C23c 7/00
U.S. Cl. 117—2     11 Claims

ABSTRACT OF THE DISCLOSURE

A method of increasing the hardness, wear resistance, and load carrying capactiy of non-uniform softer areas of a continuous metallic surface such as a railway rail by:
(a) preheating the softer areas and
(b) surface alloying on the softer areas a metal having the desirable characteristics of the adjoining areas to attain a surface of uniform characteristics.

---

This invention relates generally to a method for repairing metal surfaces and more particularly to an improved method of obtaining uniform hardness on the surface of railroad rails.

Heretofore, it has been known that railroad rails are joined by high heat emitting welding, processes such as by thermit welding, utilizing an exothermic reaction to produce great values of heat. The great heat generated relieves the hardness stresses of the rail metal which leave this material in a softer state. This softer material therefore is subject to greater wear variance resulting in local depressions at every joint. The depressions cause severe vibrations and noise on passing trains and on their becoming severe can cause great damage to the trains.

It is the general object of this invention to provide a method for repairing the worn down rail joints.

Another object of the present invention is to provide a rail with uniform hardness, wear resistance and load carrying capacity throughout its entire surface.

The objects of the present invention are achieved by providing a process capable of installing a uniform wear hardness and load carrying characteristics in welded rail joints by welding on the rail joint a metal powder. The metal powder is welded on the metal joint by a heat process that is capable of generating a molten pool with the metal powder and surface alloying the metal powder to the distressed areas of the rail joints but without disturbing the hardness of adjoining surfaces.

Although the principles of the present invention can be broadly applicable to all applications where uniform metal properties are desirable, the invention has particular effective utility in the repairing of railroad rail joints and thus will be so described.

Generally rail joints are connected by a welding process such as thermit welding utilizing exothermic heat to the area to be welded. This high heat however heats the areas immediately adjacent the welded joint areas to a sufficient high temperature to cause them to lose their hardness and related characteristics. The effected softer areas has been found to be an area of about 3" in length adjacent the welded joint. The softer rail area upon use will of course wear faster than the harder overall rail surface resulting in localized depressions at every joint of depths ranging from .05" to .060" which cause severe vibrations and noise in passing trains. In addition, these depressions can damage to the wheels of the passing trains.

It will be understood that the problem of course is to obtain a surface on the softer rail areas which surface would have pretty closely similar hardness, wear and load carrying characteristics as the adjacent rail. It has been found that metal powders having suitable wear hardness and load carrying characteristics as hereinafter described can be surface alloyed to the depressed areas through a low heat simultaneously spraying and molten pool generation process to permit an overlay weld deposit on these soft areas that we have desirable load carrying wear and hardness characteristics. The use of the low heat surface alloying process is paramount due to the necessity of preventing the creation of additional soft areas in the surface adjoining the rail surface being overlaid which would be accomplished if a high heat welding process is utilized. The metal spraying and molten pool generation of the metal powders are achieved by a welding torch and process such as that shown in U.S. Patent 3,226,028 and involve light preheating of the soft base metal, spraying of metal powder thereon, the generation of a molten pool and the slow cooling of the surface deposit which has characteristics similar to those of the adjoining rail areas. The metal powders to be utilized are any of the known metal powders such as nickel, iron and cobalt base alloys.

An advantageous composition of an alloy powder meeting the objectives of this invention is

| | Range | to | Preferred Range | Example, percent |
|---|---|---|---|---|
| Constituent: | | | | |
| Cr | 2.5–20.0 | | 4.5–16.0 | 14.9 |
| Si | 0.5–6.0 | | 2.5–5.0 | 4.3 |
| B | 0.5–5.0 | | 1.0–4.0 | 3.4 |
| Fe | 0.2–6.0 | | 0.3–4.5 | 4.2 |
| C | 0.01–.85 | | 0.3–0.7 | .68 |
| Ni | Balance | | Balance | Balance |

Another advantageous composition of an alloy meeting the objectives of this invention is:

| | Range | to | Preferred Range | Example, percent |
|---|---|---|---|---|
| Constituent: | | | | |
| Si | 1.0–6.0 | | 3.0–4.0 | 3.54 |
| B | 0.5–5.0 | | 1.5–2.5 | 2.02 |
| Fe | 0–3.0 | | 0.4–0.9 | .45 |
| C | 0.01–0.35 | | 0.01–0.10 | .04 |
| Ni | Balance | | Balance | Balance |

Another advantageous composition of an alloy meeting the objectives of this invention is:

| | Range | to | Preferred Range | Example, percent |
|---|---|---|---|---|
| Constituent: | | | | |
| B | 0.7–3.5 | | 1.1–2.0 | 1.5 |
| Si | 1.0–4.0 | | 2.0–3.0 | 2.6 |
| Fe | 0–0.7 | | 0–0.6 | .50 |
| C | 0.01–0.35 | | 0.01–0.10 | .03 |
| Ni | Balance | | Balance | Balance |

Another advantageous composition of an alloy meeting the objectives of this invention is:

| | Range | to | Preferred Range | Example, percent |
|---|---|---|---|---|
| Constituent: | | | | |
| Ni | 0.1–4.0 | | 0.5–3.2 | 3.0 |
| Cr | 23.0–30.0 | | 26.0–30.0 | 28.0 |
| Si | 0.2–2.5 | | 0.7–1.3 | 1.0 |
| B | 0.7–4.0 | | 1.5–2.2 | 2.0 |
| Fe | 0.2–3.0 | | 1.0–2.5 | 2.0 |
| C | 0.5–2.5 | | 0.8–1.5 | 1.0 |
| W | 0.5–8.0 | | 4.0–6.0 | 4.5 |
| Co | Balance | | Balance | Balance |

Another advantageous composition of an alloy meeting the objectives of this invention is:

| Constituent: | Range to | Preferred Range | Example, percent |
|---|---|---|---|
| Chromium | 22–35 | 26–32 | 30.5 |
| Carbon | 3.5–6 | 4–4.5 | 4.3 |
| Boron | .5–2.0 | .75–1.25 | 1.05 |
| Silicon | Up to 6 | .01–2 | .25 |
| Manganese | Up to 4 | .01–1.5 | .1 |
| Nickel | Up to 8 | | |
| Iron | Balance | Balance | Balance |

Alternatively, it will be understood that the foregoing process can also be advantageously utilized in any type of application where there exists valuable hardnesses and where uniform hardness is necessary. As for example, another application is with butt welded joints and rails where the wear takes place at either side of the entire welded joint.

It will now be understood that the objects of this invention have been achieved by providing a process for generating a process for modifying a surface having valuable wear hardness and load carrying characteristics to ones having uniform wear hardness and load carrying characteristics.

We claim:

1. A method of increasing the hardness, wear resistance and load carrying capacity of non-uniform softer areas of a continuous metallic surface to attain a surface of uniform characteristics by the steps of:
   (a) preheating said softer areas by such heat that will not affect the hardness of the adjoining areas and;
   (b) surface alloying by flame spraying on said softer areas a metal powder to form a molten pool which upon cooling forms a deposit having the desirable characteristics of the adjoining areas to attain a surface of uniform characteristics.

2. The method of claim 1 wherein said softer areas through use had worn below the adjoining areas and the softer areas are built up to the thickness of the adjoining surfaces.

3. The method of claim 2 wherein said softer areas are depressed from wear to a depth ranging from .05" to .060" below adjoining areas.

4. The method of claim 1 wherein said metal comprises the following constituents in the weight percentages indicated:

| Constituent— | Range |
|---|---|
| Cr | 2.5–20.0 |
| Si | 0.5–6.0 |
| B | 0.5–5.0 |
| Fe | 0.2–6.0 |
| C | 0.01–.85 |
| Ni | Balance |

5. The method of claim 1 wherein said metal comprises the following constituents in the weight percentages indicated:

| Constituent— | Range |
|---|---|
| Si | 1.0–6.0 |
| B | 0.5–5.0 |
| Fe | 0–3.0 |
| C | 0.01–0.35 |
| Ni | Balance |

6. The method of claim 1 wherein said metal comprises the following constituents in the weight percentages indicated:

| Constituent— | Range |
|---|---|
| B | 0.7–3.5 |
| Si | 1.0–4.0 |
| Fe | 0–0.7 |
| C | 0.01–0.35 |
| Ni | Balance |

7. The method of claim 1 wherein said metal comprises the following constituents in the weight percentages indicated:

| Constituent— | Range |
|---|---|
| Ni | 0.1–4.0 |
| Cr | 23.0–30.0 |
| Si | 0.2–2.5 |
| B | 0.7–4.0 |
| Fe | 0.2–3.0 |
| C | 0.5–2.5 |
| W | 0.5–8.0 |
| Co | Balance |

8. The method of claim 1 wherein said metal comprises the following constituents in the weight percentages indicated:

| Constituent— | Range |
|---|---|
| Chromium | 22 to 35 |
| Carbon | 3.5 to 6 |
| Boron | .5 to 2.0 |
| Silicon | Up to 6 |
| Manganese | Up to 4 |
| Nickel | Up to 8 |
| Iron | Balance |

9. A method of increasing hardness, wear resistance, and load carrying capacity of non-uniform softer areas of a railway rail which originally comprised two rails which have been welded together by the application of heat to a degree sufficient to decrease the hardness of those portions of the original rails adjacent to each other, and wherein the softer area has worn creating a depression, said method comprising the steps of:
   (a) preheating said softer areas by such heat that will not affect the hardness of the adjoining areas and;
   (b) flame spraying a coating of a metal to form a molten pool of the metal on said softer areas without disturbing the hardness of adjoining areas wherein the metal of the molten pool upon cooling has the characteristics of hardness substantially equal to the non-heat affected areas of the adjacent rails, whereby a substantially uniform surface of substantially uniform hardness results.

10. A method of increasing hardness, wear resistance, and load carrying capacity of worn, non-uniform, softer areas of a heat-softened railway rail joint, comprising the steps of:
   (a) preheating said softer areas by such heat that will not affect the hardness of the adjoining areas and;
   (b) flame spraying a coating of a metal on said softer areas without disturbing the hardness of adjoining areas wherein the metal of the molten pool upon cooling has the characteristics of hardness substantially equal to the nonheat-softened areas adjacent to the joint, to create a substantially planar upper surface free of depressions which will wear uniformly.

11. The method of claim 10 wherein the heat-softened joint was formed by thermit welding.

References Cited

UNITED STATES PATENTS

| | | | |
|---|---|---|---|
| 3,341,337 | 12/1967 | Quuas et al. | 117—105.2 X |
| 3,305,326 | 2/1967 | Longo | 117—105.2 X |
| 3,139,514 | 6/1964 | Kaesmacher | 117—202 X |
| 2,802,756 | 8/1957 | Bloom | 117—202 X |
| 2,688,180 | 9/1954 | Morton et al. | 117—2 X |
| 2,436,867 | 3/1948 | Lee | 117—202 |
| 2,187,348 | 1/1940 | Hodson | 117—105.2 |

ALFRED L. LEAVITT, Primary Examiner

A. M. GRIMALDI, Assistant Examiner

U.S. Cl. X.R.

117—105, 105.5